United States Patent [19]

Hathcock et al.

[11] Patent Number: 4,852,146
[45] Date of Patent: Jul. 25, 1989

[54] AUXILIARY DIALING SYSTEM FOR MOBILE TELEPHONES

[75] Inventors: Steven L. Hathcock, 888 Muirfield Trail, Marietta, Ga. 30067; Bruce M. Johnson, Marietta, Ga.

[73] Assignee: Steven L. Hathcock, Atlanta, Ga.

[21] Appl. No.: 58,038

[22] Filed: Jun. 4, 1987

[51] Int. Cl.$^4$ ............................................. H04M 11/00
[52] U.S. Cl. ........................................ 379/58; 379/63; 379/355
[58] Field of Search ....................... 379/60, 61, 62, 63, 379/59, 58, 355; 455/33, 34

[56] References Cited

U.S. PATENT DOCUMENTS

| | | | |
|---|---|---|---|
| 3,988,550 | 10/1976 | Ts'ao | 179/90 |
| 4,117,542 | 9/1978 | Klausner | 364/900 |
| 4,122,304 | 10/1978 | Mallien | 179/2 EB |
| 4,186,279 | 1/1980 | Saline | 179/90 B |
| 4,242,539 | 12/1980 | Hashimoto | 179/5.5 |
| 4,243,845 | 1/1981 | Feinberg et al. | 179/90 B |
| 4,281,413 | 7/1981 | Forrest | 455/34 |
| 4,341,929 | 7/1982 | Alexander et al. | 179/90 B |
| 4,431,870 | 2/1984 | May et al. | 179/81 |
| 4,443,661 | 4/1984 | Kubo | 179/2 EB |
| 4,455,454 | 6/1984 | Umebayashi | 179/2 E |
| 4,463,221 | 7/1984 | Soulliard et al. | 179/2 EB |
| 4,473,720 | 9/1984 | Hegi | 179/90 B |
| 4,486,624 | 12/1984 | Puhl | 179/2 EB |
| 4,503,288 | 3/1985 | Kessler | 179/2 DP |
| 4,511,764 | 4/1985 | Nakayama et al. | 179/90 AN |
| 4,588,863 | 5/1986 | Ress | 379/355 |
| 4,697,281 | 9/1987 | O'Sullivan | 455/33 |
| 4,718,080 | 1/1988 | Serrono et al. | 379/63 |

OTHER PUBLICATIONS

Limeback, "Cellular Link is Step to Portable Office", Electronics, Jun. 28, 1984, pp. 48–50.

Primary Examiner—Jin F. Ng
Assistant Examiner—David H. Kion
Attorney, Agent, or Firm—Thomas & Kennedy

[57] ABSTRACT

An auxiliary dialing system for a mobile telephone of the type having a handset coupled with a radio transceiver by a data transmission line comprises a data process and control module having a microprocessor and data storage devices. The data process and control module includes a key pad for entering data into the data storage devices and a display for displaying data entered from the keyboard and retrieved from the data storage devices. The data process and control module is connected to an interface module which is in turn spliced into the data transmission line between the handset and the radio transceiver. The interface module insures that when a telephone number is transmitted from the data process and control module to the transceiver, the data is placed on the data transmission line in such a way that it does not interfere with or corrupt data being transmitted from the handset to the transceiver and vice versa in normal operation of the mobile telephone. Telephone number may thus be automatically dialed by the data process and control means by transmitting the numbers to the radio transceiver through the interface module so that the radio transceiver places the telephone call as if it had been dialed from the handset.

6 Claims, 4 Drawing Sheets

AUXILIARY DIALING SYSTEM FOR MOBILE TELEPHONES

TECHNICAL FIELD

This invention relates generally to mobile telephones such as those used in vehicles within a cellular network, and specifically to auxiliary dialing systems for incorporation into such mobile telephones.

BACKGROUND OF THE INVENTION

Mobile telephones have been in use for many years. Typically, these systems have comprised a handset which rests in a cradle inside an automobile adjacent the driver's seat. The handset is connected by a cable to a radio transceiver that is located in a remote part of the automobile, such as the trunk. The handset has an earpiece, a mouthpiece and a set of keys for use in dialing telephone numbers. In use, the driver, or one of his passengers, lifts the handset from the cradle, enters a sequence of numbers representing the telephone number of the person he wishes to call, and presses a send button on the handset. This action instructs the radio transceiver to place the call as dialed.

There have been a number of problems and inconveniences associated with the use of such mobile telephones. For example, if a user does not remember the number he wishes to dial, he must refer to a written phone directory, such as one stowed in the vehicle glove compartment In dialing a telephone number, the user must, of course, watch the keyboard or keypad on the handset to make sure he dials the correct sequence of numbers. It is often necessary to hold the handset in one hand in doing this while holding the steering wheel of the car with the other hand. These procedures are not only cumbersome and frequently inaccurately executed, but can actually be dangerous since they require a driver to divert his attention from the road and to handle communication equipment while driving.

Although electronic dictionaries and "Rolodex" systems are old in the art of land line telephone systems, a clear need has existed for an auxiliary apparatus for mobile phone systems that could store and automatically dial telephone numbers while not requiring a driver to fumble with a telephone directory, divert his attention from the road, or attempt to dial numbers manually while driving. Any such apparatus would, however, have to emulate the dialing functions of the existing handset so that the radio transceiver would place telephone calls as if they had been dialed from the handset itself. Thus, data from such an auxiliary dialing system would have to be transmitted to the radio transceiver in a manner that would not interfere with or corrupt data being then sent between the transceiver and the handset. This problem is compounded for the add-on market by the fact that mobile telephone systems are made by a number of different manufacturers and can operate internally in vastly different ways.

Thus, it is the provision of an auxiliary dialing system that overcomes these operative and technical problems to which the present invention is primarily directed.

SUMMARY OF THE INVENTION

An auxiliary dialing system is now provided for use with mobile cellular telephone systems. The dialing system has a keyboard for the entry of alphanumeric characters, a display, data processing and control means, and means for operative interconnection with conventional mobile telephone systems. The keyboard and display unit is designed to be mounted on the dashboard or windshield of an automobile so that a user does not have to look significantly away from the road while using the auxiliary dialing system. An interconnect module is connected to the keyboard and display unit which is adapted to be spliced into the existing line that connects the handset with the transceiver so that the keyboard and display unit can communicate with the transceiver.

A set of telephone numbers can be stored in the system and recalled by entering a character or a string of characters that appear with names associated with the numbers. Telephone numbers can also be dialed manually. The system is adapted for incorporation into various mobile telephone systems without interference with their own normal operations in such a manner that the radio transceiver need not recognize whether it is the handset or the auxiliary dialing system that is being operated.

When a user wishes to use the mobile telephone in the normal way, the interconnect module is effectively transparent, i.e. the telephone system operates as if no auxiliary dialing system is present. When a user instead operates the auxiliary dialing system, data is transmitted to the radio transceiver without interference or corruption of signals being sent to and from the handset. Audio signals are transmitted to the transceiver through channels that are separate from those used to transmit the telephone numbers.

In a preferred form of the invention a process for introducing stored data into a connecting line between a mobile telephone handset and a radio transceiver comprises the steps of storing telephone number data, determining when the data may be introduced into the line without interfering with the signal from the handset to the transceiver, and applying the data to the line without interfering with signals from the handset to the transceiver.

In another preferred form of the invention an auxiliary dialing system is provided for a mobile telephone of the type having a handset coupled with a radio transceiver. The auxiliary dialing system comprises a computer that has data memory means, means for entering a telephone number into the memory means, and means for determining the active/inactive status of data transmission between the handset and radio transceiver. The system also has means for transmitting telephone numbers entered into memory to the radio transceiver upon verification that data is not then being transmitted between the handset and transceiver.

BRIEF DESCRIPTION OF THE DRAWING

FIG. 4 is a schematic diagram of an alternative form of the interconnect module.

DETAILED DESCRIPTION

Figure 1:
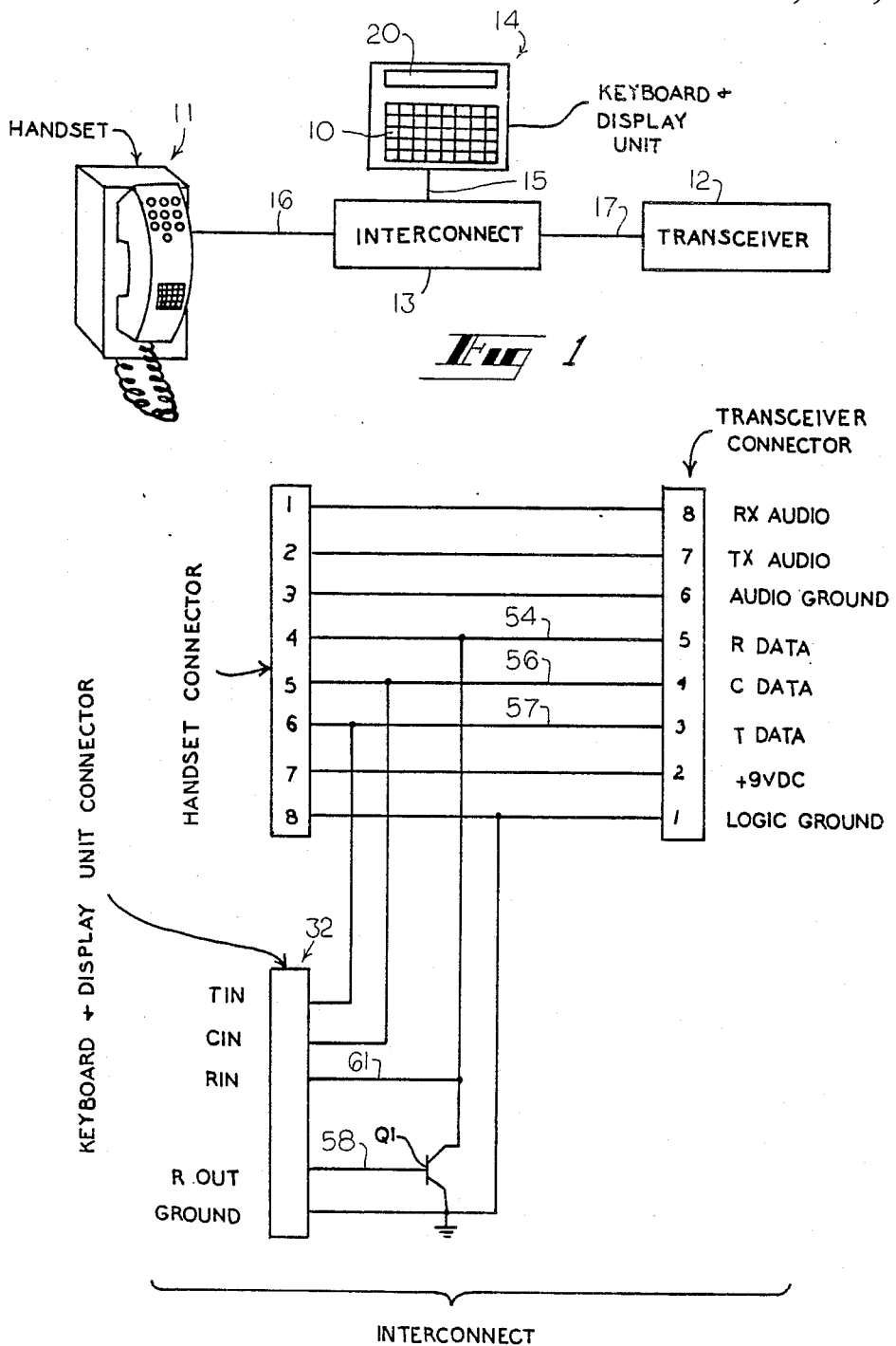
FIG. 1 is a block diagram of a mobile telephone system which has an auxiliary dialing system that embodies principles of the present invention.

Referring now in more detail to the drawing, FIG. 1 shows a mobile telephone, preferably for use in a vehicle, that comprises a handset 11 and a radio transceiver 12.

The handset 11 is conventional and has a keyboard, audio transducers and in some cases, a display. The radio transceiver is also conventional.

Spliced into the cable that normally connects the handset 11 to the transceiver 12 is shown an interconnect module 13 from which a cable 15 extends to an auxiliary keyboard and display unit 14. The keyboard and display unit 14 is adapted to be mounted on or near the dashboard of an automobile for easy access and observation by an automobile driver. Unit 14 has a keyboard 10 for use in manually inputting information and instructions. The unit also has a liquid crystal type display 20 for displaying alphanumeric characters such as a specific telephone number and the name of the associated party.

Figure 2:
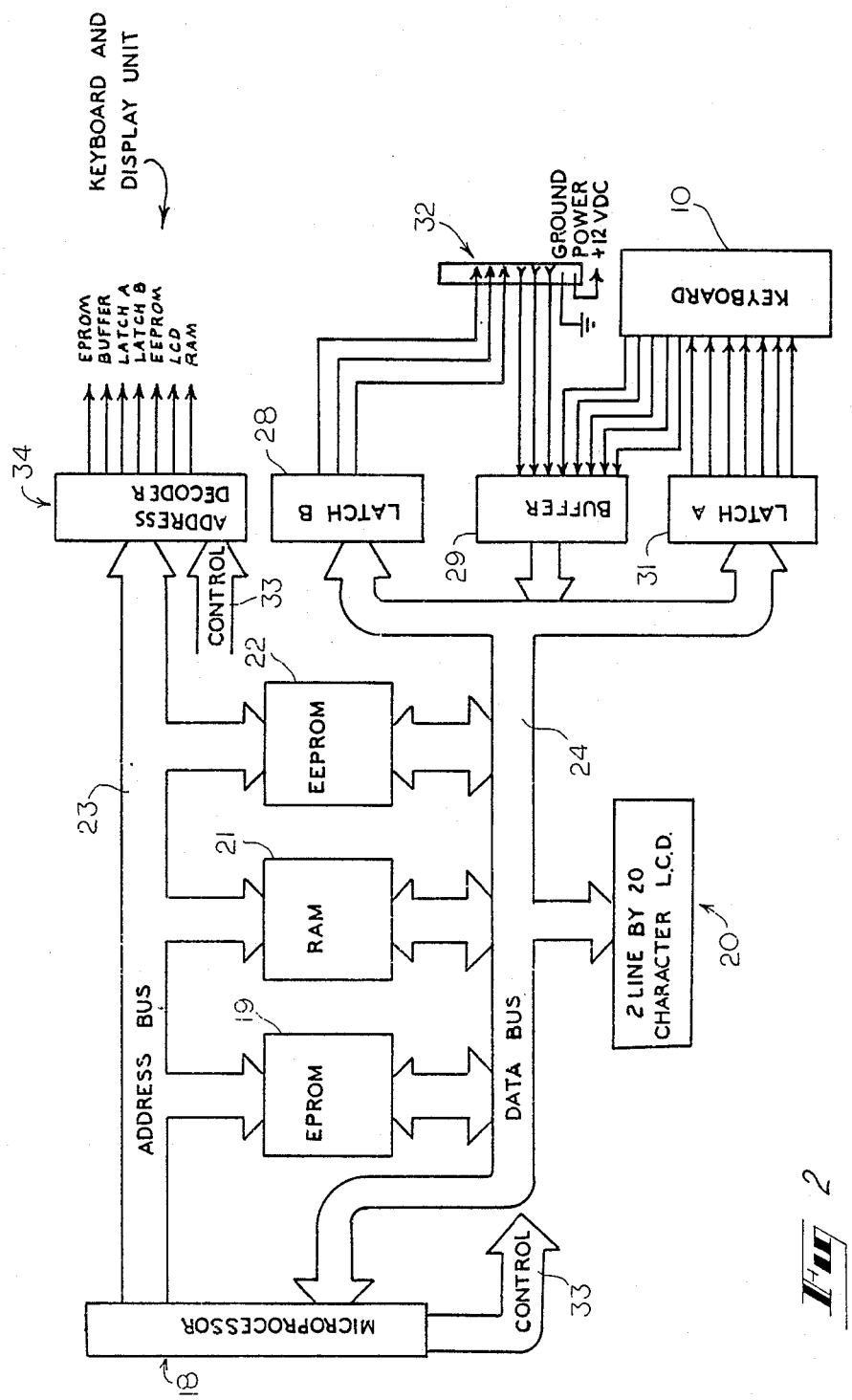
FIG. 2 is a block diagram of the keyboard and display unit of the auxiliary dialing system of FIG. 1 which unit also has data processing and control means.

FIG. 2 shows principal components of the keyboard and display unit 14 and their organization. The unit comprises a 6502 type microprocessor 18 that is connected with various data source modules through a data bus 24. Sources from which microprocessor 18 may receive data include an erasable programmable read only memory (EPROM) 19, a random access memory (RAM) 21, an electrically erasable programmable read only memory (EEPROM) 22, the keyboard 10, and from outside the unit 14 itself via a buffer 29 and connector 32 that is coupled with the interconnect module 13 through cable 15. Microprocessor 18 may also send data over the data bus 24 to each of the data sources and to the display 20.

Microprocessor 18 chooses the device with which it needs to communicate at any particular time through address lines 23 and control lines 33 which are connected to an address decoder 34 for activation of the specific device addressed. The memory location within the chosen device where data is to be stored or retrieved is controlled by microprocessor 18 via the address bus.

An EPROM 19 contains the computer program which controls the dialing system. An EEPROM 22 contains names and telephone number information which make up a telephone directory for use in calling frequently dialed parties. A random access memory 21 is provided for temporary storage of variables during the execution of the program and for the brief storage of telephone numbers which are inputted from the keyboard 10. A latch A and a buffer is associated with the keyboard for identifying the key that has been pressed.

Figure 3:
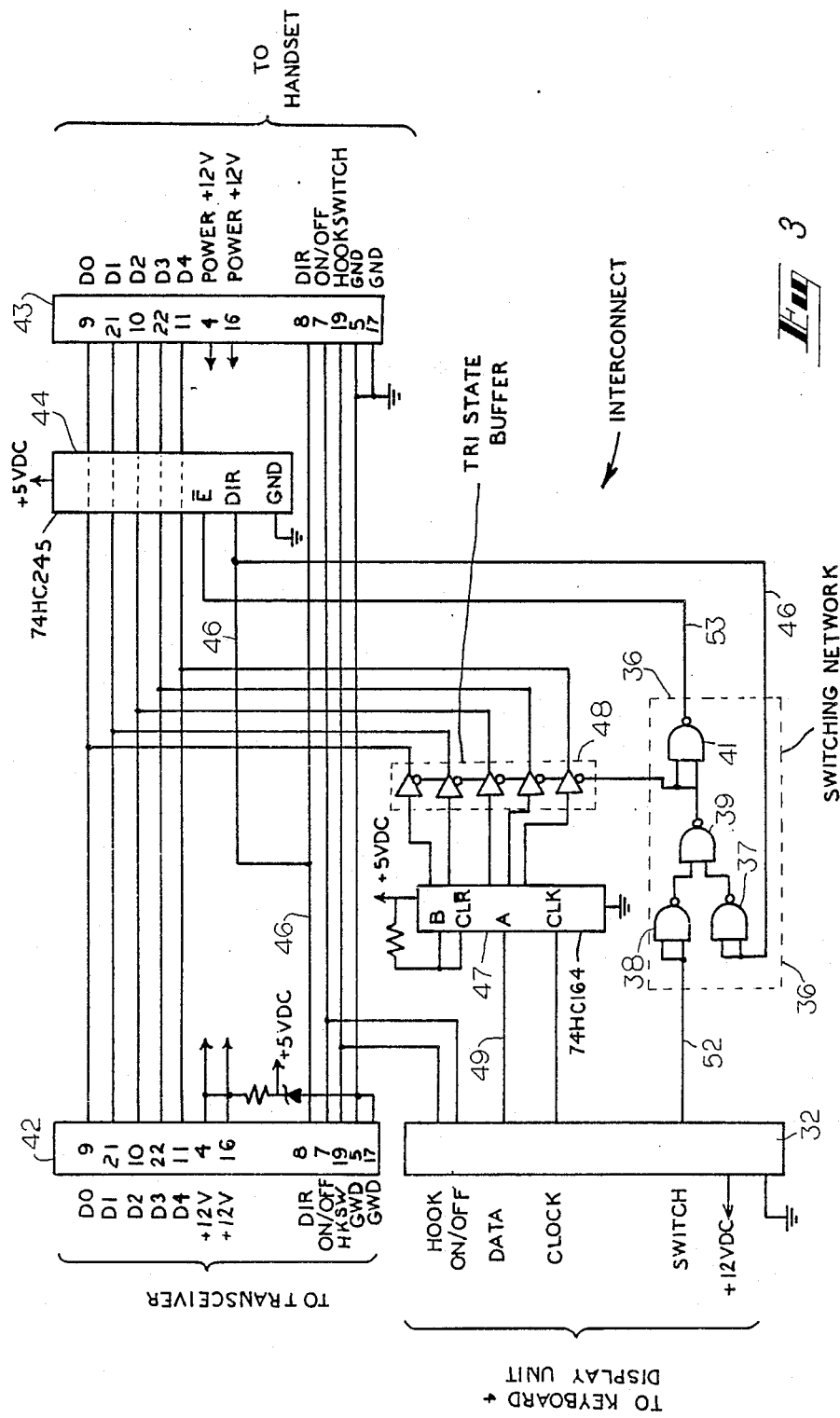
FIG. 3 is a schematic diagram of the interconnect module of the auxiliary dialing system.

The interconnect module 13 is the device by which the keyboard and display unit 14 is connected as an auxiliary dialing device to a conventional mobile telephone which may have already been installed and operated. A number of manufacturers produce mobile radio telephones for use in cellular networks so that the protocol by which the handset and receiver communicate can be different for each of the various models. As a consequence, different models of mobile telephones may require an interconnect module that is designed for its use. There are, however, two principal protocol and thus two basic designs of interconnect modules which are shown in FIGS. 3 and 4, respectively. FIG. 3 is a schematic diagram of an interconnect module for use with radio telephone models such as those manufactured by Mitsubishi and Panasonic while FIG. 4 is a schematic diagram of an interconnect module for use with mobile telephones such as those currently manufactured by Motorola, OKI and General Electric. The principal distinguishing factor between the two types of modules is that the latter is designed to operate with transceivers that are always in a mode for the reception of internal digital data from the handset while the former is designed to operate with transceivers that are only intermittently capable of receiving internal data.

In FIG. 3 data lines D-0 through D-4 are connected through a bidirectional bus transceiver 44, a transceiver connector 42 and with a handset connector 43. Handset and transceiver connectors 42 and 43 are in turn connected via cables 16 and 17 to the handset and the transceiver. In normal operation, a telephone number dialed from the handset is coded into a five bit binary number and transmitted to the transceiver along data lines D-0 through D-4. The purpose of the interconnect module shown in FIG. 3 is to allow the keyboard and display unit 14 to "tap into" data lines D-0 through D-4 and to transmit a telephone number to the transceiver as if it had been dialed from the handset. Transceiver 12 also sends data to the handset 11 along data lines D-0 through D-4. This, of course, is in addition to the audio signals that are transmitted between the handset and transceiver. To avoid interfering with normal communications between the handset and the transceiver, data can only be sent from the keyboard and display unit 14 at a time when the transceiver is in a mode to receive such data and yet the handset is not actually sending data to the transceiver. These timing constraints are met with the interconnect module design of FIG. 3, used with the keyboard and display unit of FIG. 2, in the following manner.

Five bits of data representing a number or an instruction to the transceiver are sent from the keyboard and display unit 14 to interconnect 13 over cable 15 to connector 32. The bits are sent in serial fashion to a shift register 47 via data line 49. The shift register 47 holds each bit in storage until the tri-state buffer 48 is instructed to pass the data. Each of the five storage locations within the tri-state buffer 48 is connected to one of the data lines D-0 through D-4 so that when the buffer is instructed to release the data the five bits of data representing a number or instruction are placed on data lines D-0 through D-4 as if the number or instruction had actually been dialed from handset 11.

Once a byte of data representing a number or instruction has been sent from keyboard and display unit 14 and held by the shift register and buffer, keyboard and display unit 14 may instruct interconnect module 13 to release the data onto data lines D-0 through D-4 by placing switch line 52 in a logic low state. This switch line 52 is connected to switching network 36 within which are located four NAND gates 37, 38, 39, and 41. The switch line 52 is connected to both inputs of NAND gate 38 such that NAND gate 38 acts merely as an inverter. The inputs of the NAND gate 37 are both connected to direction line 46, the logic state of which is controlled by the transceiver 12. When transceiver 12 is in a mode to accept data, it places direction line 46 in a logic low state. The outputs of NAND gates 37 and 38 are connected to the inputs of another NAND gate 39 which has its output connected to both inputs of yet another NAND gate 41. NAND gate 41, therefore, also acts as an inverter so that when the logic state at the output of the NAND gate 39 is high, the logic state at output 53 of NAND gate 41 is low and vice versa.

The output of NAND gate 39 is connected to tri-state buffer 48 such that a logic state low at the output of NAND gate 39 causes tri-state buffer 48 to release the five bits of data held therein. Output line 53 of NAND gate 41 is connected to the enabled pin E of a bidirectional bus transceiver 44. A logic state high at output 53 causes the bidirectional bus transceiver 44 to prevent the flow of data from the handset to the transceiver along data lines D-0 through D-4.

A logic state low appearing at switch line 52 indicates that shift register 47 has been filled with bits of data representing a number and that these bits of data are ready to be released onto data lines D-0 through D-4. A logic state low at direction line 46 indicates that transceiver 12 is ready to accept data from data lines D-0 through D-4. It can be seen, then, that when a logic state low appears at both switch line 52 and direction line 46, conditions are met for releasing the data contained in the tri-state buffer onto data lines D-0 through D-4.

Using the circuit of FIG. 3 and the truth table of a NAND gate, it can be seen that a logic state low at 52 and 46 causes a logic state high to appear at both inputs of NAND gate 39. This causes output 51 of NAND gate 39 to switch to a logic state low which in turn causes output 53 of NAND gate 41 to switch to logic state high. The logic state high at output 53 acts to inhibit the transfer of data from the handset while the logic state low at output 51 simultaneously releases the data held within tristate buffer 48 onto data lines D-0 through D-4. The result is that when the keyboard and display unit 14 is ready to release a byte of data, and when transceiver 12 is ready to receive a byte of data, handset 11 is in effect disconnected from data lines D-0 through D-4 and the five bits of data contained in tri-state buffer 48 are simultaneously placed onto the data lines so that no interference in data streams can occur. The number represented by the five bits is thus received by transceiver 12 as if it had been dialed from handset 11.

FIG. 4 illustrates a second form of end interconnect module 13 which is used with mobile telephone systems such as those currently manufactured by Motorola, OKI and General Electric. In these types of mobile telephones such as that specifically made by Motorola, information, R data, is sent from the handset to the transceiver along one line 54 while information from the transceiver to the handset is sent along a separate line 57 which also serves as a line for timing (T) data. Thus, transceiver 12 is always ready to receive digital data from the handset. Therefore, to send information from keyboard and display unit 14 to transceiver 12, it is necessary to check that line 54 is not in the active mode, i.e. that the handset is not sending information to the transceiver. This condition is met in the embodiment shown in FIG. 4 when line 54 is high and also both C data line 56 and T data line 57, which are conventionally dedicated to clock and timing functions, are in a logic state low. Lines 54, 56 and 57 are connected within the interconnect module directly to the keyboard and display unit 14 through connector 32. When the keyboard and display unit is ready to transmit bits representing a number or an instruction to transceiver 12, the software program executing in microprocessor 18 checks to see that lines 56 and 57 are each in a logic low state indicating that line 54 is idle when it is high. If it is, the software program causes data to be placed onto route line 58 which activates transistor Q1 which provides sufficient current to place the data onto R data line 54 for transmission to the transceiver. Each time a bit of data is sent, the software program checks to see that the data did indeed appear on data line 54. This is done by checking RIN line 61 which is connected to line 54. If the bit that was transmitted did not appear on data line 54, the software waits a specified period of time and then transmits the data again. This is a built-in precaution intended to avoid interference with data sent from the handset along data line 54 in the situation where a number is dialed on the handset between the time when lines 54, 56 and 57 are checked for idle and the time when a data bit is outputted from the keyboard and display unit.

Figure 5:
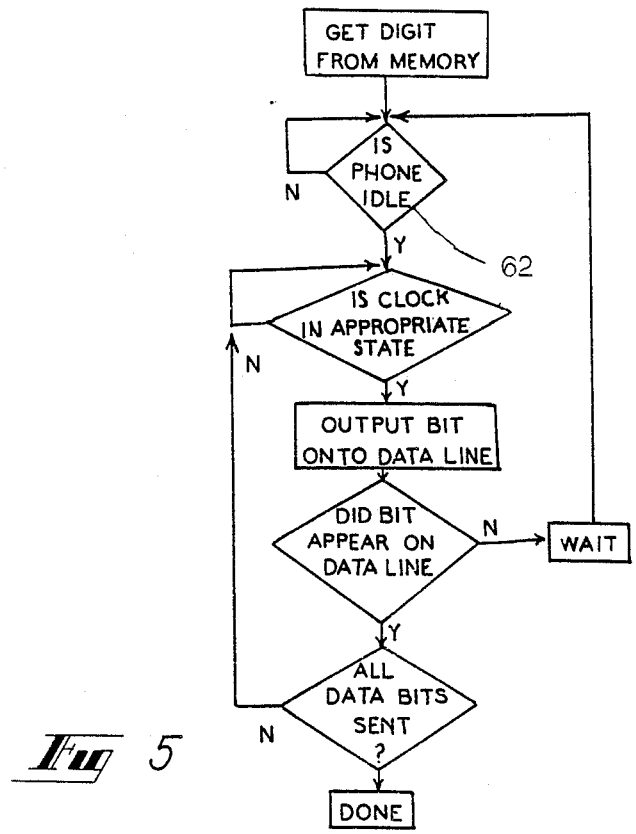
FIG. 5 is a flow chart showing logic associated with dialing a telephone number when using the interconnect module of FIG. 4.

FIG. 5 is a flow chart that illustrates the process using the interconnect embodiment shown in FIG. 4. There, decision block 62 is the point at which the software program checks lines 54, 56 and 57 to verify that they are both in a logic low state which indicates that the system is idle.

Figure 6:
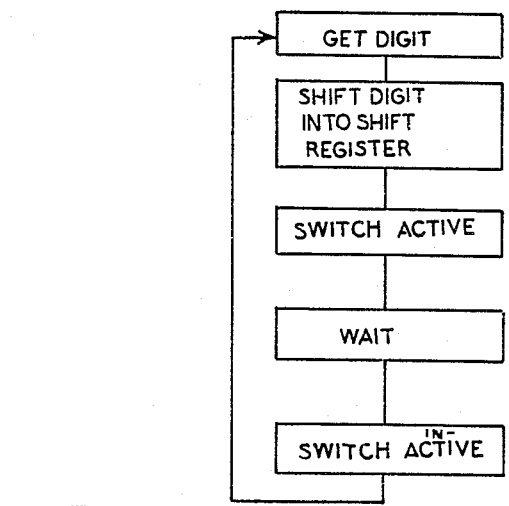
FIG. 6 is a flow chart showing logic associated with dialing a telephone number when using the interconnect module of FIG. 3.

FIG. 6 is a flow chart that illustrates the steps executed by the software program in the keyboard and display unit for the interconnect embodiment shown in FIG. 3. The first step shown in this figure is to place the five bits representing a telephone number or instructions into the shift register 47 for temporary storage. The second step is to activate switch line 52 indicating that a number is ready to be transmitted. The software program then waits for a period of time sufficient to allow transceiver 12 to switch to the receive data mode. At this point switching network 36 causes handset 11 to be switched out by bidirectional bus transceiver 44 and simultaneously causes the data stored in the shift register to be released onto the data lines and transmitted to the transceiver 12. This is followed by a wait period to insure that the transceiver has received the data. The switch is then inactivated to place the handset back on line.

MANUAL OPERATION

In a typical installation, the transceiver and the interconnect module are stored in the trunk of a car, the handset is located adjacent the driver's seat, and the keyboard and display unit placed atop the dashboard adjacent the windshield where it is easily accessible by the driver. When the driver, or a passenger, wishes to place a telephone call, he or she may either enter the number to be dialed directly using keyboard 10 or enter a name or a part of a name for directory search. If the number is entered directly from the keyboard 10, the digits appear one by one in sequence on the display 20. If the directory is accessed, the software program searches the data stored in EEPROM 22 until it locates the name containing the sequence of characters entered. Both the name and the telephone number then appear on the display.

If the number appearing is visually verified as being correct, the user presses a dial button on the keyboard which activates the process of sending data to the transceiver through the interconnect module. When all the digits in the telephone number have been transmitted from the keyboard and display unit 14 to the transceiver 12, the "SEND" instruction causes the transceiver to place the call in a conventional manner.

It thus is seen that an auxiliary dialing system is now provided that may be readily incorporated into mobile telephones of many manufacturers and operated without interference with normal phone operation. Although the invention has been described in the form of two preferred embodiments, many modifications, additions and deletions may be made thereto without departure from the spirit and scope of the invention as set forth in the following claims.

We claim:

1. An auxiliary dialing system for a mobile telephone of the type having a handset coupled with a radio transceiver by data lines and by a timing line with the timing line carrying signals indicative of the active/inactive status of the data lines, said auxiliary dialing system comprising data processing and control means which includes a microprocessor, data memory means and keyboard means for entering telephone numbers into said data memory means; means for determining the active/inactive status of the data lines comprising direct connections between the timing line and said data process and control means by which the microprocessor may detect signals carried by the timing line and thereby determine the active/inactive status of the data lines; and means for introducing telephone number data from said data memory means onto said data lines upon a determination that the status of said data lines is inactive.

2. An auxiliary dialing system as claimed in claim 1 wherein said microprocessor causes telephone number data to be introduced onto said data lines upon a determination that the status of said data lines is inactive.

3. An auxiliary dialing system for a mobile telephone of the type having a handset coupled with a radio transceiver by a data transmission line, said auxiliary dialing system comprising data process and control means that includes data memory means; means for entering telephone numbers into said memory means; and means for determining the presence or absence of signals being transmitted on said data line between said handset and said transceiver and for introducing data from said data process and control means onto said data transmission line only in the absence of signals from said handset to said transceiver, said data introducing means comprising means for determining if the transceiver is in a data receive means for determining if the transceiver is in a data receive mode, means for interrupting data transmission from the handset to the transceiver to insure that such data is not present on said data transmission line, and means for transmitting a telephone number entered into said memory means to said radio transceiver over said data line when the transceiver is in a data receive mode and data transmission from the handset has been interrupted by said interrupting means.

4. An auxiliary dialing system for a mobile telephone as claimed in claim 3, and further including a data direction line indicating the direction in which data is traveling along said data transmission lines between said handset and said transceiver, wherein said means for determining if the transceiver is in a data receive mode comprises means connected to said data direction line for detecting when data is flowing from said handset to said transceiver.

5. An auxiliary dialing system as claimed in claim 4 wherein said data process and control means includes a microprocessor having a signal line and said data introducing means comprises a register that is fillable by the microprocessor with data representing telephone numbers, said register being coupled to said microprocessor through said signal line, said register being coupled to said means for determining when the transceiver is in a data receiver mode and to said data lines so that when said microprocessor signals via said signal line that said register is full and when the transceiver signals via said direction line that it is in a data receive mode, said register releases the data stored therein onto said data lines.

6. An auxiliary dialing system as claimed in claim 5 further comprising means for decoupling said handset from said transceiver when said register is full and said transceiver is in a data receive mode, said means for decoupling being connected to receive signals from said means for determining when the transceiver is in a data receive mode.

* * * * *